United States Patent [19]

Gorman et al.

[11] Patent Number: 5,611,791
[45] Date of Patent: Mar. 18, 1997

[54] SHEET OF LOOP MATERIAL, AND GARMENTS HAVING SUCH LOOP MATERIAL INCORPORATED THEREIN

[75] Inventors: Michael R. Gorman; Dennis L. Becker; Donald W. Folske; William L. Melbye; Susan K. Nestegard; Ronald L. Ott, all of St. Paul, Minn.

[73] Assignee: Minnesota Mining and Manufacturing Company, St. Paul, Minn.

[21] Appl. No.: 585,262

[22] Filed: Jan. 11, 1996

Related U.S. Application Data

[60] Continuation of Ser. No. 142,190, Oct. 26, 1993, abandoned, which is a division of Ser. No. 555,049, Jul. 18, 1990, Pat. No. 5,256,231, which is a continuation-in-part of Ser. No. 517,409, Apr. 27, 1990, abandoned, which is a continuation of Ser. No. 193,832, May 13, 1988, abandoned.

[51] Int. Cl.$^6$ .................................................. A61F 13/15
[52] U.S. Cl. ............................. 604/391; 2/912; 24/445
[58] Field of Search ............................ 604/389–391; 24/442–446; 2/912, 920; 128/DIG. 15

[56] References Cited

U.S. PATENT DOCUMENTS

| | | | |
|---|---|---|---|
| 2,639,250 | 5/1953 | Reinhardt | 154/78 |
| 2,918,762 | 12/1959 | Hurst | 51/407 |
| 3,142,604 | 7/1964 | Mills et al. | 154/435 |
| 3,142,611 | 7/1964 | Mills | 256/72 |
| 3,182,346 | 5/1965 | Winston | 156/244.25 |
| 3,345,688 | 10/1967 | Billarant | 156/436 |
| 3,382,122 | 5/1968 | Nalle, Jr. | 156/244.25 |
| 3,533,871 | 10/1970 | Zentmyer | 156/205 |
| 3,562,044 | 2/1971 | Erb | 156/176 |
| 3,577,607 | 5/1971 | Ikoma | 24/204 |
| 3,621,764 | 11/1971 | Muller et al. | 156/205 |
| 3,676,242 | 7/1972 | Prentice | 156/178 |
| 3,694,867 | 10/1972 | Stumpf | 24/204 |
| 3,703,739 | 11/1972 | Young et al. | 51/406 |
| 3,708,384 | 1/1973 | Carpenter | 161/65 |
| 3,723,213 | 3/1973 | Hoey | 156/178 |
| 3,733,226 | 5/1973 | Stoller | 156/72 |
| 3,862,872 | 1/1975 | Hoey | 156/435 |
| 3,869,764 | 3/1975 | Tanaka et al. | 24/204 |
| 3,893,879 | 7/1975 | Ita et al. | 156/201 |
| 3,913,183 | 10/1975 | Brumilk | 24/204 |
| 3,955,246 | 5/1976 | Tanaka | 24/204 |
| 3,959,051 | 5/1976 | Schirmer | 156/85 |
| 3,982,978 | 9/1976 | Carpenter | 156/72 |
| 4,169,303 | 10/1979 | Lemelson | 24/204 |
| 4,263,755 | 4/1981 | Globus | 51/297 |
| 4,437,269 | 3/1984 | Shaw | 53/358 |
| 4,477,938 | 10/1984 | Rogut | 51/401 |

(List continued on next page.)

FOREIGN PATENT DOCUMENTS

| | | |
|---|---|---|
| 0142338 | 5/1985 | European Pat. Off. . |
| 0223075 | 5/1987 | European Pat. Off. . |
| 0289198 | 2/1988 | European Pat. Off. . |
| 0325473 | 7/1989 | European Pat. Off. . |
| 0341993 | 11/1989 | European Pat. Off. . |
| 3903204 | 2/1990 | Germany . |
| 56-152584 | 11/1981 | Japan . |
| 495122 | 8/1970 | Switzerland . |
| 2164900 | 4/1986 | United Kingdom . |
| 2168653 | 6/1986 | United Kingdom . |

*Primary Examiner*—Robert A. H. Clarke
*Attorney, Agent, or Firm*—Gary L. Griswold; Walter N. Kirn; William L. Huebsch

[57] ABSTRACT

A sheet of loop material adapted to be cut into pieces to form loop portions for fasteners of the type comprising releasably engageable hook and loop portions, or to be incorporated into items such as disposable garments or diapers or into sheets of abrasives. The sheet of loop material includes a sheet of longitudinally oriented fibers having anchor portions and arcuate portions projecting in one direction away from the anchor portions, and a layer of thermoplastic backing material extruded onto the anchor portions to bond to the anchor portions and form at least a portion of a backing for the loop material. The thermoplastic backing material can also bond the sheet of fibers to a sheet of backing material.

5 Claims, 4 Drawing Sheets

U.S. PATENT DOCUMENTS

| | | | |
|---|---|---|---|
| 4,592,943 | 1/1986 | Cascian et al. | 428/171 |
| 4,609,581 | 9/1986 | Ott | 428/100 |
| 4,614,220 | 9/1986 | Savage | 156/244.11 |
| 4,617,022 | 10/1986 | Pigneul et al. | 604/391 |
| 4,617,767 | 10/1986 | Ali | 51/406 |
| 4,686,136 | 8/1987 | Homonoff et al. | 428/286 |
| 4,734,298 | 3/1988 | Kikukawa | 427/256 |
| 4,759,816 | 7/1988 | Kasper et al. | 156/244.11 |
| 4,761,318 | 8/1988 | Ott et al. | 156/244.11 |
| 4,784,919 | 11/1988 | Tokuno et al. | 428/500 |
| 4,894,060 | 1/1990 | Nestegard | 604/391 |
| 4,910,062 | 3/1990 | Zinke et al. | 428/95 |
| 5,032,122 | 7/1991 | Noel et al. | 604/391 |
| 5,254,194 | 10/1993 | Ott et al. | 156/176 |

SHEET OF LOOP MATERIAL, AND GARMENTS HAVING SUCH LOOP MATERIAL INCORPORATED THEREIN

CROSS REFERENCE TO RELATED APPLICATIONS

This is a continuation of application Ser. No. 08/142,190 filed Oct. 26, 1993, now abandoned, which application is a division of application Ser. No. 07/555,049 filed Jul. 18, 1990, now U.S. Pat. No. 5,256,231, which application is a continuation in part of U.S. patent application Ser. No. 07/517,409 filed Apr. 27, 1990 now abandoned, which is a continuation of U.S. patent application Ser. No. 07/193,832 filed May 13, 1988, now abandoned. The content of patent application Ser. Nos. 07/517,409 and 07/193,832 are incorporated herein by reference.

TECHNICAL FIELD

The present invention relates to sheets of loop materials adapted to be cut into pieces to form the loop portions for fasteners of the type including releasably engageable hook and loop portions, to methods for making such sheets of loop materials, and to garments such as disposable diapers including pieces of such loop material.

BACKGROUND OF THE INVENTION

Many sheets of loop materials are known that are adapted to be cut into pieces to form the loop portions for fasteners of the type comprising releasably engageable hook and loop portions. Such sheets of loop materials typically comprise a backing and a multiplicity of loops formed from longitudinally oriented polymeric fibers anchored in the backing and projecting from a front surface of the backing so that they may be releasably engaged with the hooks on the hook portion of such a fastener, and can be made by many methods including conventional weaving, or knitting techniques. Sheets of loop materials in which the loops are stitched into the backing are described in U.S. Pat. Nos. 4,609,581 and 4,770,917. While the loop fastener portions made from many such sheets of loop materials work well with many different hook fastener portions, many of the processes by which the sheets of loop material are made are more expensive than may be desired, particularly when the loop fastener portions are intended for a limited amount of use, such as to attach a disposable diaper to an person.

DISCLOSURE OF INVENTION

The present invention provides a sheet of loop material adapted to be cut into pieces to form the loop portions for fasteners of the type comprising releasably engageable hook and loop portions and a method and equipment for making that sheet of loop material, which sheet of loop material, method and equipment provide effective loop fastener portions for such fasteners that are very inexpensive to manufacture either in a form intended for a limited amount of use, such as to releasably attach a disposable diaper or other disposable garment to a person, or in a form intended to be used a larger number of times.

According to the present invention there is provided a sheet of loop material adapted to be cut into pieces to form loop portions for fasteners, which sheet of loop material includes a backing comprising a thermoplastic backing layer with generally uniform morphology, and a sheet of longitudinally oriented fibers having generally non-deformed anchor portions bonded or fused in the thermoplastic backing layer at spaced bonding locations, and arcuate portions projecting from a front surface of the backing between the bonding locations.

When the sheet of loop material is used to form loop portions of fasteners intended for limited use (i.e., for uses in which the fastener will ordinarily be opened and closed 10 times or less), preferably the arcuate portions of the sheet of fibers have a height from the backing of less than about 0.64 centimeters (0.250 inch) and preferably less than about 0.38 centimeters (0.15 inch); the width of the bonding locations should be between about 0.005 and 0.075 inch; and the width of the arcuate portions of the sheet of fibers should be between about 0.06 and 0.35 inch. Also, the fibers in the arcuate portions should project to about the same height above the front surface of the backing, which height is at least one third, and preferably one half to one and one half the distance between the bonding locations, the individual fibers should be less than 25 denier in size, and the fibers collectively should have a basis weight in the range of 5 to 300 grams per square meter (and preferably in the range of 15 to 100 grams per square meter) measured along the front surface of the backing to provide sufficient open area between the fibers along the arcuate portions (i.e., between about 10 to 70 percent open area) to afford ready engagement of the fibers along the arcuate portions by the hook portion of the fastener.

When the sheet of loop material is used to form loop portions of fasteners intended for more than limited use (i.e., for uses in which the fastener is adapted to be opened and closed more than 10 times, and in some many more than 10 times, such as 50,000 times), the arcuate portions of the sheet of fibers can have a height similar to that indicated above, and the width of the bonding locations can also be about the same, however, the sheet of fibers preferably has a higher basis weight in the range of 75 to 150 grams per square meter measured along the front surface of the backing so that more loops are available for engagement by the hook portion of the fastener, and the individual fibers could be up to 32 denier in size. Such increased basis weight can be achieved by causing the method according to the present invention to place the anchor portions of the sheet of fibers closer together along the backing so that the width of the arcuate portions of the sheet of fibers measured along the front surface of the backing is far less even though the lengths of the individual fibers in each arcuate portion are about the same.

The sheet of loop material according to the present invention is made by forming a sheet of longitudinally oriented polymeric fibers so that the sheet of fibers has arcuate portions projecting in the same direction from spaced anchor portions of the sheet of fibers, and then forming at least a portion of a backing around the spaced anchor portions of the sheet of fibers by extruding thermoplastic material onto the anchor portions of the sheet of fibers so that the arcuate portions of the sheet of fibers project from a front surface of the newly formed backing.

Such forming of the sheet of fibers is preferably done by providing first and second generally cylindrical corrugating members each including a plurality of uniformly spaced ridges defining its periphery, mounting the corrugating members in axially parallel relationship with portions of the ridges of the corrugating members in mesh with each other, rotating at least one of the corrugating members, feeding the sheet of fibers between the meshed portions of the ridges of the rotating corrugating members to generally conform the sheet of fibers to the periphery of the first corrugating member, thereby forming the arcuate portions of the sheet of fibers in spaces between the ridges of the first corrugating member and the anchor portions of the sheet of fibers along outer surfaces of the ridges of the first corrugating member, and retaining the formed sheet of fibers along the periphery of the first corrugating member after it has moved past the meshing portions of the ridges. At least a portion of the backing (or the entire backing) is then formed around the anchor portions of the sheet of fibers by extruding the molten thermoplastic material onto the anchor portions of the sheet of fibers while those anchor portions are on the end surfaces of the ridges on the first corrugating member. Such forming of the backing around the anchor portions of the sheet of fibers provides the advantage compared to sonic welding or other forms of heat fusion of the fibers to a pre-formed backing that the fibers in the anchor portions are generally non-deformed (even though the outer fibers in the anchor portions may be slightly flattened) and thus the individual fibers retain most of their initial strength adjacent the bonding location, while with the proper combination of materials the surface of the fibers can be fused to the backing material to firmly anchor the fibers in the backing; and the resultant thermoplastic layer in which the fibers are bonded has generally uniform morphology throughout (even though the morphology of the backing may be slightly altered around the anchor portions of the sheet of fiber due to their effect as a heat sink), rather than having different morphological structures in large portions extending through the backing through which sonic energy or other sources of heat were applied to bond the anchor portions of the sheet of fibers to the backing compared to adjacent portions of the backing, which differences in morphological structures typically weakens the backing. The thermoplastic material extruded onto the anchor portions of the sheet of fibers can be of the type that solidifies as it cools, or can be of the type called reactive hot melts that partially solidify as they cool and then cross link as a result of exposure to an external element such as atmospheric moisture or ultraviolet radiation. Also, the thermoplastic material can be extruded onto both the anchor portions of the fibers and onto an adjacent surface of a sheet of backing material intended to be incorporated into the backing (e.g., a layer of polymeric film or a layer of adhesive) or onto both the anchor portions of the fibers and onto an adjacent surface of a sheet of support material intended to shape or retain the shape of the backing as it cures, which sheet of support material can later be stripped away.

Preferably the thermoplastic material is extruded onto the anchor portions of the sheet of fibers just prior to a nip between the first corrugating member and a cooling roller. The cooling roller then either forms the surface of the backing opposite the sheet of fibers when the backing is formed only of the extruded thermoplastic material, or guides along its surface any sheet of backing material or support material intended to be incorporated into or support the backing so that the cooling roller brings that sheet of backing or support material into intimate contact with the side of the molten thermoplastic material opposite the anchor portions of the sheet of fibers in the nip between the cooling roller and the first corrugating roller.

When the cooling roller is rotated at a slower peripheral speed (e.g., one quarter or one half the peripheral speed) than the first corrugating roller, the anchor portions of the sheet of fibers along the ridges of the first corrugating roller will be pushed closer together in the molten layer of extruded thermoplastic material at the nip between the first corrugating roller and the cooling roller, resulting in a sheet of loop material that has more loop portions per square inch and a greater basis weight for the sheet of fibers than when the peripheral speeds of the first corrugating roller and the cooling roller are the same. This technique for increasing loop portions and basis weight of the sheet of fibers on the sheet of loop material is useful both to make sheets of loop materials having different numbers of loop portions per centimeter of backing length using the same equipment, and to make sheets of loop materials with more loop portions per centimeter of backing length than could be formed between ridges machined on the corrugating members because of physical limitations involved in machining such ridges close together.

The ridges of the corrugating members can be elongate and generally parallel so that the bonding locations are also elongate and generally parallel and are continuous in one direction across the front surface of the backing so that continuous rows of the arcuate portions extend across the backing of the sheet of loop material; or alternately the ridges can be elongate, generally parallel, and in a regular pattern of discontinuous lengths so that the parallel bonding locations are also in a regular pattern of discontinuous lengths to form a regular pattern of discontinuous rows of the arcuate portions of the sheet of fibers along the front surface of the backing. Also it is contemplated that the ridges of the first corrugating member can form interlocking closed patterns (e.g., in the shape of circles, diamonds, octagons, letters, numbers, etc.) to form corresponding patterns for the arcuate portions of the fibers along the front surface of the backing, in which case the second corrugating member will be formed with post like ridges to press the sheet of fibers into the centers of the closed patterns.

Elongate ridges on the corrugating members can be oriented parallel to axes of the corrugating members, or at right angles to the axes of the corrugating members with the corrugating members extending around the corrugating members, or at many other angles with respect to the axis of the corrugating members so that the rows of arcuate portions of the sheet of fibers, whether continuous or discontinuous, can be oriented along or transverse to the sheet of fibers fed between the corrugating member or at many angles therebetween.

The individual longitudinally oriented fibers may be of many polymeric materials such as polypropylene, polyethylene, polyester, nylon or polyamide, or combinations of such materials such as a core of polyester and a sheath of polypropylene which provides relatively high strength due to its core material and is easily bonded due to its sheath material. Fibers of one material or fibers of different materials or material combinations may be used in the same sheet of fibers.

The sheet of fibers may be fed between the meshed ridges of the corrugating members in the form of a non woven or random woven sheet in which the fibers may or may not be bonded together. In such a sheet the fibers may be disposed in various directions with respect to the direction the sheet of fibers is fed between the corrugating members so that in the resultant sheet of loop material the fibers are disposed in various directions with respect to the spaced bonding locations. In such a sheet of fibers to be fed between corrugating members with spaced parallel ridges, preferably a majority of the fibers (e.g., over 70 or 90 percent) project in one direction along the sheet of fibers and the sheet of fibers is fed between the corrugating members with that direction at about a right angles to the ridges on the corrugating members so that in the resultant sheet of loop material a majority of the fibers project at about right angles to the parallel bonding locations.

Alternatively, the fibers may be provided in the form of yarns in the range of 50 to 300 denier, the yarns distributed to provide a sheet of generally uniformly distributed fibers by passing them through a comb, and the sheet of fibers fed between corrugating members having elongate parallel ridges oriented in the range of 0 to 45 degrees with respect to their axes in a direction perpendicular to their axes, which results in a sheet of loop material in which the fibers all extend in directions at about the same angle with respect to the parallel bonding locations.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
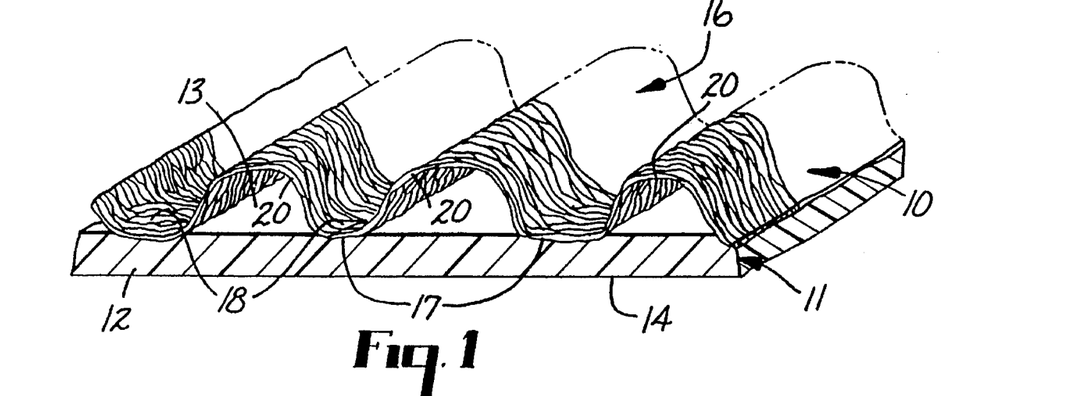
FIG. 1 is a perspective view of a first embodiment of a sheet of loop material according to the present invention.
Figure 2:
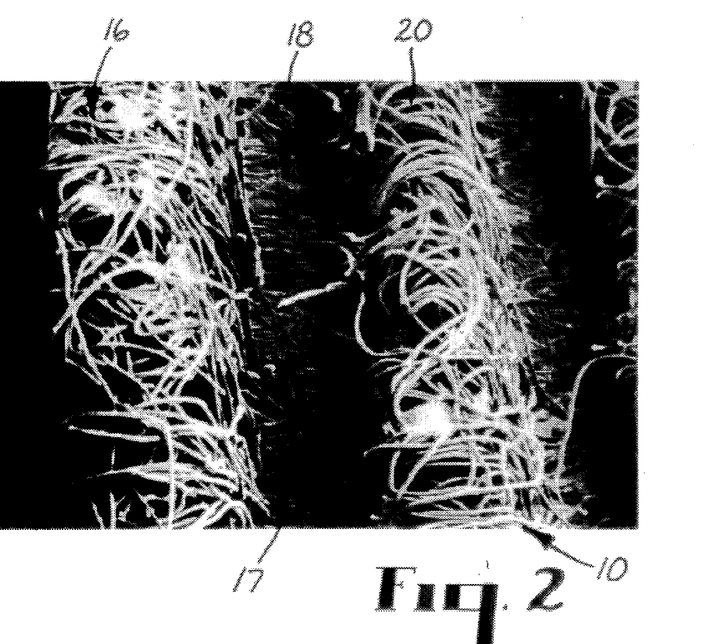
FIG. 2 is a photograph at a magnification of 15 of the sheet of loop material of FIG. 1.
Figure 3:
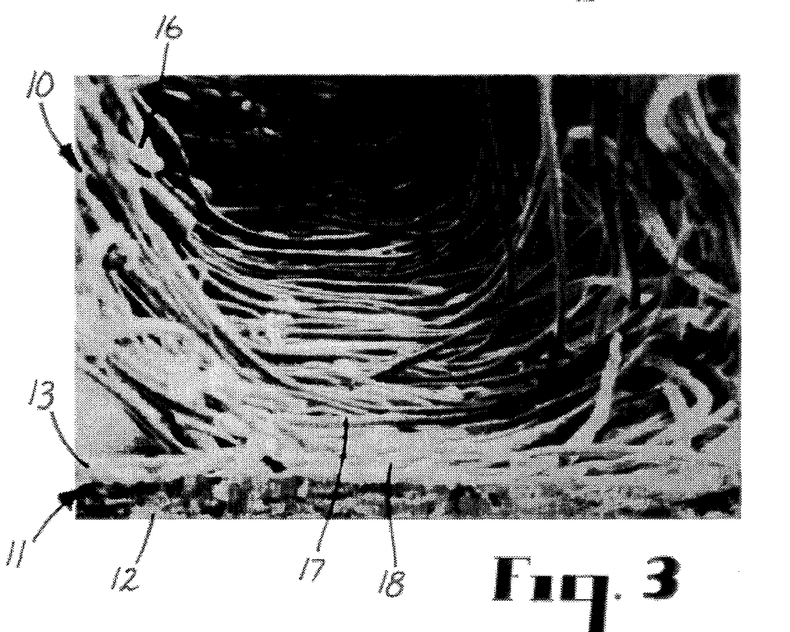
FIG. 3 is a photograph at a magnification of 50 of the sheet of loop material of FIG. 1.

FIGS. 1, 2 and 3 illustrate a first embodiment of a sheet of loop material according to the present invention, generally designated by the reference numeral 10, which sheet of loop material 10 is adapted to be cut into pieces to form the loop portions for fasteners of the type intended for limited use and having releasably engageable hook and loop portions. Generally the sheet of loop material 10 has a backing 11 comprising a thermoplastic backing layer 12 (e.g., of polypropylene) in the range of about 0.00125 to 0.025 centimeters (0.0005 to 0.010 inch) thick having generally uniform morphology, front and rear major surfaces 13 and 14, and a multiplicity of longitudinally oriented fibers in a specially formed sheet of fibers 16 having anchor generally non-deformed anchor portions 17 bonded by being embedded in the backing layer 12 at spaced elongate generally parallel bonding locations 18 that are continuous in one direction along the front surface 13 with arcuate portions 20 of the sheet of fibers 16 projecting from the front surface 13 of the backing layer 12 between the bonding locations 18 in continuous rows also extending transversely across the sheet of loop material 10. The arcuate portions 20 of the sheet of fibers 16 have a generally uniform height from the backing layer 12 of less than about 0.64 centimeters (0.250 inch) and preferably less than about 0.381 centimeters (0.150 inch), the height of the formed sheet of fibers 16 is at least one third, and preferably one half to one and one half times the distance between the bonding locations 18, the individual fibers in the sheet of fibers 16 are less than 25 denier (preferably in the range of 1 to 10 denier) in size, and the sheet of fibers 16 without the backing 11 has a basis weight in the range of 5 to 300 grams per square meter (and preferably in the range of 15 to 100 grams per square meter) measured along the first surface 13 to provide sufficient open area between the fibers in the sheet of fibers 16 along the arcuate portions 20 (i.e., between about 10 and 90 percent open area) to afford ready engagement of the individual fibers along the arcuate portions 20 by the hook portion of the fastener.

The fibers in the sheet of fibers 16 can be disposed in various directions with respect to the parallel bonding locations 18 and may or may not be bonded together at crossover points in the arcuate portions 20; can be disposed in various directions with respect to the parallel bonding locations 18 with the majority of the fibers in the sheet of fibers 16 (i.e., over 80 or 90 percent) extending in directions at about a right angle to the bonding locations 18; or all of the individual fibers in the sheet of fibers 16 can extend in directions generally at right angles to the spaced generally parallel bonding locations 18.

Figure 4:
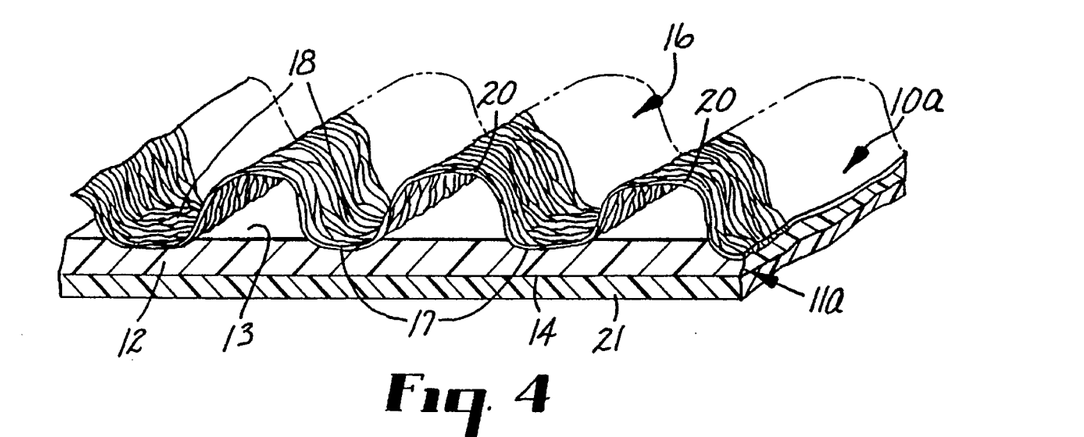
FIG. 4 is a perspective view of a second embodiment of a sheet of loop material according to the present invention.

FIG. 4 illustrates a second embodiment of a sheet of loop materials according to the present invention, generally designated by the reference numeral 10a, which sheet of loop material 10a has the same structure as the sheet of loop material 10 (the same reference numerals being used with respect to the corresponding portions thereof) except that backing 11a of the sheet of loop material 10a includes a second sheet, of backing materials 21, which second sheet of backing material 21 is adhered on the side 14 of the thermoplastic backing layer 12 opposite the sheet of fibers 16. The second sheet of backing material 21 in the backing 11a of the sheet of loop material 10a is a polymeric film which can be printed on one of its surfaces to provide a sheet of loop material 10a on which the printing (which could be decorative, indicate a trade name, or provide instructions) can be clearly seen through the sheet of fibers 16.

Figure 5:
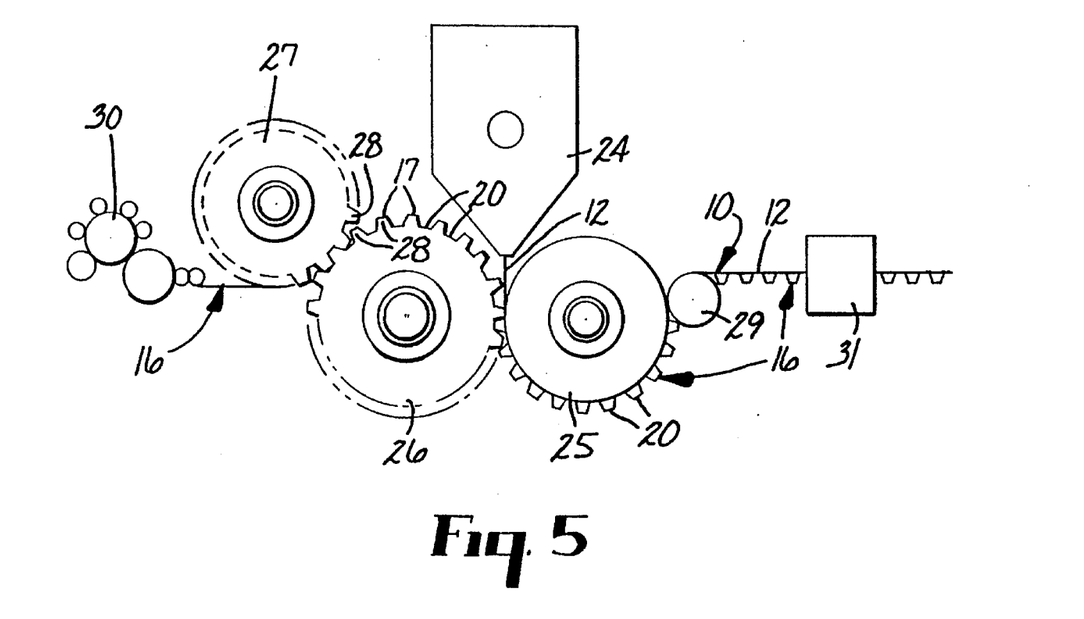
FIG. 5 is a schematic view illustrating a first embodiment of a method and equipment according to the present invention for making the sheet of loop material of FIG. 1.

FIG. 5 schematically illustrates a first embodiment of a method and equipment according to the present invention for forming the sheet of loop material 10. The method illustrated in FIG. 5 generally comprises forming longitudinally oriented polymeric fibers into a sheet of fibers 16, forming the sheet of fibers 16 so that it has arcuate portions 20 projecting in the same direction from spaced generally parallel anchor portions 17 of the sheet of fibers 16, and bonding the spaced generally parallel anchor portions 17 of the sheet of fibers 16 in the backing layer 12 with the arcuate portions 20 of the fibers 16 projecting from the front surface 13 of the backing 12. This method is performed by providing first and second heated corrugating members or rollers 26 and 27 each having an axis and including a plurality of circumferentially spaced generally axially extending ridges 28 around and defining its periphery, with the ridges 28 having outer surfaces and defining spaces between the ridges 28 adapted to receive portions of the ridges 28 of the other corrugating member 26 or 27 in meshing relationship with the sheet of fibers 16 between the meshed ridges 28 and to afford rolling engagement between the ridges 28 and spaces of the corrugating members in the manner of gear teeth. The corrugating members 26 and 27 are mounted in axially parallel relationship with portions of the ridges 28 of the corrugating members 26 and 27 meshing generally in the manner of gear teeth; at least one of the corrugating members 26 or 27 is rotated; and the sheet of fibers 16 is fed between the meshed portions of the ridges 28 of the corrugating members 26 and 27 to generally conform the sheet of fibers 16 to the periphery of the first corrugating member 26 and form the arcuate portions 20 of the sheet of fibers 16 in the spaces between the ridges 28 of the first corrugating member 26 and the generally parallel anchor portions 17 of the sheet of fibers 16 along the outer surfaces of the ridges 28 on the first corrugating member 26. The formed sheet of fibers 16 is retained along the periphery of the first corrugating member 26 after it has moved past the meshed portions of the ridges 28. The thermoplastic backing layer 12 is formed and bonded to the anchor portions 17 of the sheet of fibers 16 on the end surfaces of the ridges 28 on the first corrugating member 26 by extruding the thermoplastic backing layer 12 (e.g., polypropylene) in a molten state from a die 24 into a nip between the anchor portions 17 of the sheet of fibers 16 on the periphery of the first corrugating member 26 and a cooling roll 25 after which the sheet of loop material 10 is separated from the first corrugating member 26 and carried partially around the cooling roll 25 and through a nip between the cooling roller and a pinch roller 29 to complete cooling and solidification of the thermoplastic backing layer 12.

The sheet of fibers 16 fed between the meshed portions of the ridges 28 of the corrugating members 26 and 27 can be in the form of yarns distributed so that the fibers in the sheet of fibers 16 fed between the meshed ridges 28 of the corrugating members 26 and 27 are uniformly distributed across the width of the sheet of fibers 16 and all extend generally perpendicular to the axes of the corrugating members 26 and 27, or the fibers in the sheet of fibers 16 can be disposed in random orientation as in a non woven web or sheet. Such a non woven sheet of randomly oriented fibers 16 with no internal bonding except for the friction between the fibers can be formed from loose fibers using a carding machine 30 as illustrated, which non woven sheet of randomly oriented fibers 16 has enough integrity to be fed from the carding machine 30 into the nip between the corrugating members 26 and 27 (if needed, a conveyer (not shown) could be provided to help support and guide the non woven sheet of fibers 16 between the carding machine 30 and the corrugating members 26 and 27). When such a non woven sheet of randomly oriented fibers 16 is used, preferably the first corrugating member 26 has a rough finish (e.g., formed by sand blasting), the second corrugating member 27 has a smooth polished finish, and the first corrugating member 26 is heated to a temperature slightly above the temperature of the second corrugating member 26 so that the non woven sheet of fibers 16 will preferentially stay along the surface of the first corrugating member 26 and be carried to the nip between the first corrugating member and the cooling roller 25 after passing through the nip between the corrugating members 26 and 27. Optionally, the backing 11 of the sheet of loop material 10 can be printed on its surface opposite the sheet of fibers 16 through the use of a printer 31, either in the production line as illustrated, or as a separate operation. Alternatively, the printer 31 could be used to print on and thereby color or print a pattern on the sheet of fibers 16 either in the production line as illustrated, or as a separate operation.

Corrugating members 26 and 27 adapted to have such a sheet of fibers 16 fed into them can have their ridges 28 oriented generally in the range of 0 to 45 degrees with respect to their axes, but preferably have their ridges 28 oriented at 0 degrees with respect to (or parallel to) their axes which simplifies making of the corrugating members 26 and 27.

Figure 6:
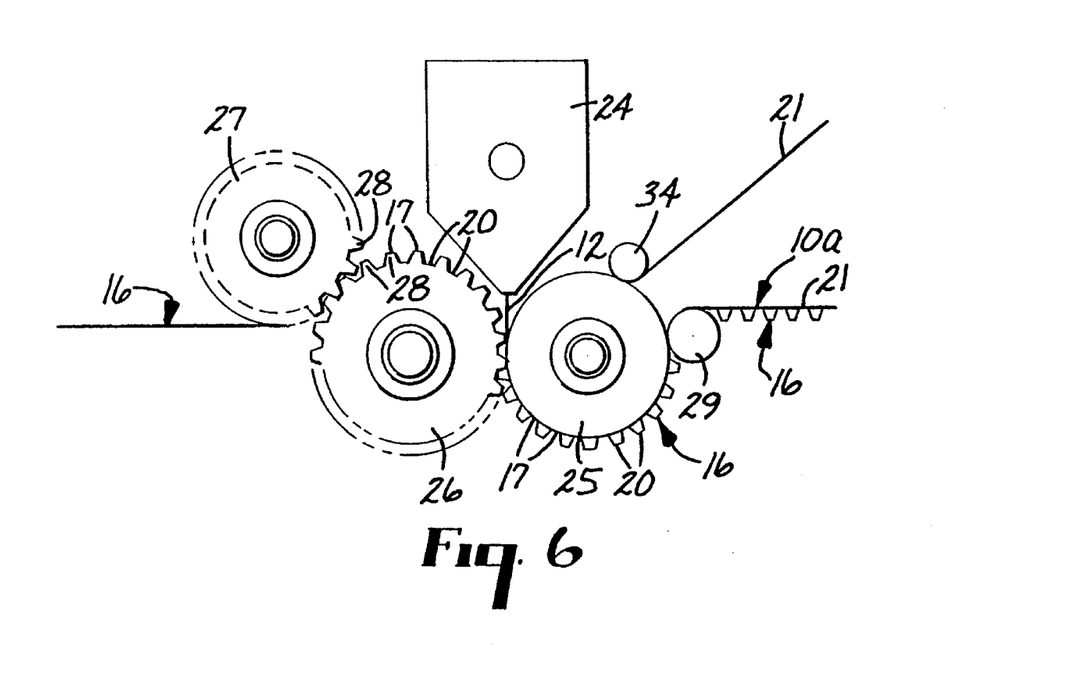
FIG. 6 is a schematic view illustrating a second embodiment of a method and equipment according to the present invention for making the sheets of loop material of FIG. 4 or FIG. 7.

FIG. 6 schematically illustrates a second embodiment of a method and equipment according to the present invention for forming the sheets of loop materials 10a, which method is generally the same and uses much of the same equipment as is illustrated in FIG. 5 (with similar portions of that equipment having the same reference numerals), except for the addition of means including a pinch roller 34 for feeding the sheet of backing material 21 or 22 into the nip between the first corrugating roller 26 and the cooling roller 25 along the surface of the cooling roller 25 which results in the extruded molten thermoplastic backing layer 12 from the die 24 being deposited between the formed sheet of fibers 16 along the periphery of the first corrugating member 26 and the sheet of backing material 21 along the surface of the cooling roll 25 so that the molten thermoplastic backing layer 12 envelopes and adheres the anchor portions 17 of the sheet of fibers 16 to the sheet of backing material 21 after which the sheet of loop material 10a is separated from the first corrugating member 26 and carried partially around the cooling roll 25 with its backing 11a against the cooling roll 25 to complete cooling and solidification of its thermoplastic backing layer 12. The molten thermoplastic backing layer 12 can be extruded into the nip, onto the anchor portions 17 of the sheet of fibers on the first corrugating member 26 prior to the nip, or onto the sheet of backing material 21 along the periphery of the cooling roller just prior to the nip as may work best for any given application. The cooling roll 25 can be water cooled and have a chrome plated periphery which is particularly useful for forming the sheet of loop material 10a because of the high rate of heat transfer such a cooling roll 25 affords from the molten thermoplastic backing layer 12, through the sheet of polymeric backing material 21 and into the cooling roll 25. Alternatively, the cooling roll 25 may have an outer rubber layer defining its surface which may be preferred for forming the sheet of loop material 10a if the sheet of backing material 22 is of a material (e.g., paper) that tends to restrict such heat transfer into the cooling roll 25, whereupon the rubber layer provides an alternative advantage of deforming adjacent its nip with the first corrugating roller 26 to provide intimate contact of the molten thermoplastic backing layer 12 with the anchor portions 17 of the sheet of fibers 16 and the sheet of backing material 21.

The sheet of backing material 21 incorporated in the backing 11a could be a woven, knitted, random woven, needle punched, nonwoven or other solid or porous layer of intertwined fibers, or could be a continuous polymeric film which allows the backing to be printed by conventional methods along one of its surfaces with graphics (such as advertising, instructions or locating marks) which will be visible through the loop portions 20 of the sheet of fibers 16 due to their large percentage of open area. Such film used for the sheet of backing material 21 may be a single layer of a polymeric material such as polypropylene, polyester, or polyamide; or may have a plurality of layers such as a central layer of a relatively high strength material such as polyester, a layer defining the first surface of a material more easily bonded to the layer of thermoplastic material 12 such as ethylene vinyl acetate or polyethylene, and a layer defining the outer surface of the backing 11a adapted to adhere the backing 11a to a substrate such as polyethylene or a bonding layer of room-temperature non-tacky thermoplastic material adapted to adhere a fastener portion to a polyolefin layer (such as may be found on a disposable diaper) that can be bonded to the polyolefin layer under heat and pressure that leaves the polyolefin layer substantially free of deformation and will hold the fastener portion to the polyolefin layer with greater force than that which is required to separate an engaged fastener, which bonding layer of room-temperature non-tacky thermoplastic material is described in allowed U.S. patent application Ser. No. 126,746 filed Nov. 30, 1987, the content whereof is incorporated herein by reference. The sheet of backing material 21 could also be a layer of pressure sensitive adhesive along a release liner disposed so that the release liner contacts the cooling roller 25, resulting in the layer of pressure sensitive adhesive being disposed along the rear surface of the layer of thermoplastic material 12 with the release liner over the layer of pressure sensitive adhesive and removable so that the pressure sensitive adhesive could be used to adhere the sheet of loop material 10a to a substrate.

Figure 7:
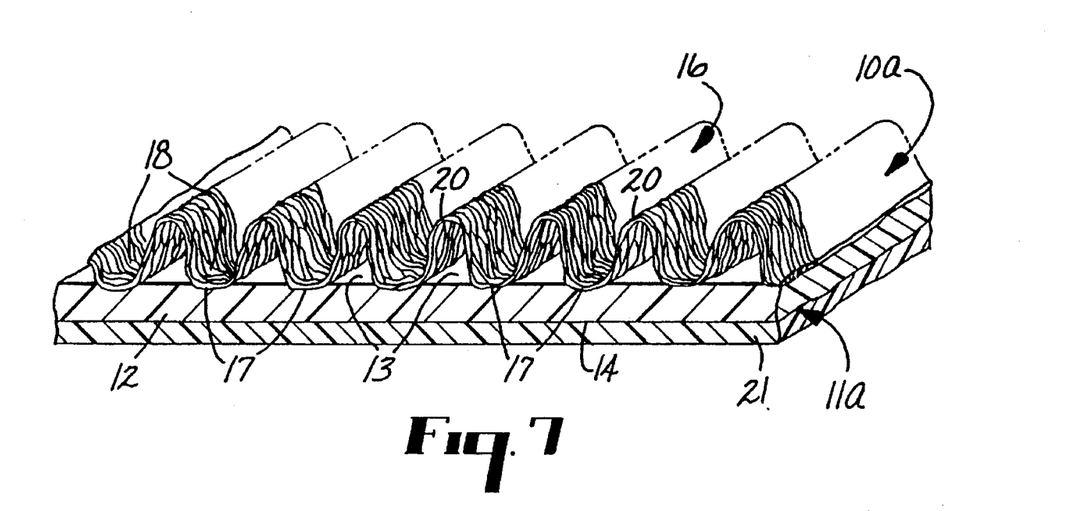
FIG. 7 is a perspective view of a third embodiment of a sheet of loop material according to the present invention.

Preferably, the drives for the corrugating members 26 and 27 and for the cooling roller 25 are separately controllable so that the cooling roller 25 can be rotated at a surface speed that is the same as or different than the surface speed of the first corrugating member 26. When the cooling roller 25 and the first corrugating member 26 are rotated so that they have the same surface speed, the sheet of fibers 16 will have about the same shape along the backing 11 or 11a as it had along the periphery of the first corrugating member 26 as is illustrated in FIGS. 1 through 4. When the cooling roller 25 and the first corrugating member 26 are rotated so that the cooling roller 25 has a surface speed that is slower than the surface speed of the first corrugating member 26, (e.g., one quarter or one half) the anchor portions 17 of the sheet of fibers 16 will be moved closer together in the molten thermoplastic backing layer 12 at the nip between the cooling roller 25 and the first corrugating member 26, resulting in greater density of the loop portions 20 along the backing 11 or 11a (illustrated in FIG. 7 for the sheet of loop material 10a) than when the cooling roller 25 and the first corrugating member 26 are rotated so that they have the same surface speed. This technique of increasing the amount of loop portions 20 or the loop population on the sheet of loop material 10 or 10a is useful both to make sheets of loop materials 10 or 10a having different numbers of loop portions 20 per centimeter of backing length using the same equipment, and to make sheets of loop materials 10 or 10a with more loops portions 20 per centimeter of backing length than could be formed between ridges 28 machined on the corrugating members 26 and 27 because of physical limitations in machining such ridges 28 close together.

Figure 8:
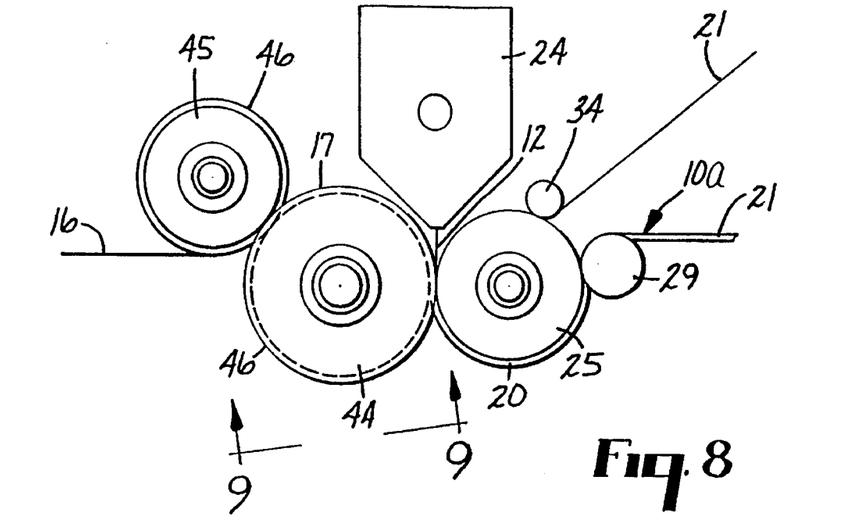
FIG. 8 is a schematic view illustrating a third embodiment of a method and equipment according to the present invention for making the sheets of loop material of FIG. 4.
Figures 9, 10:
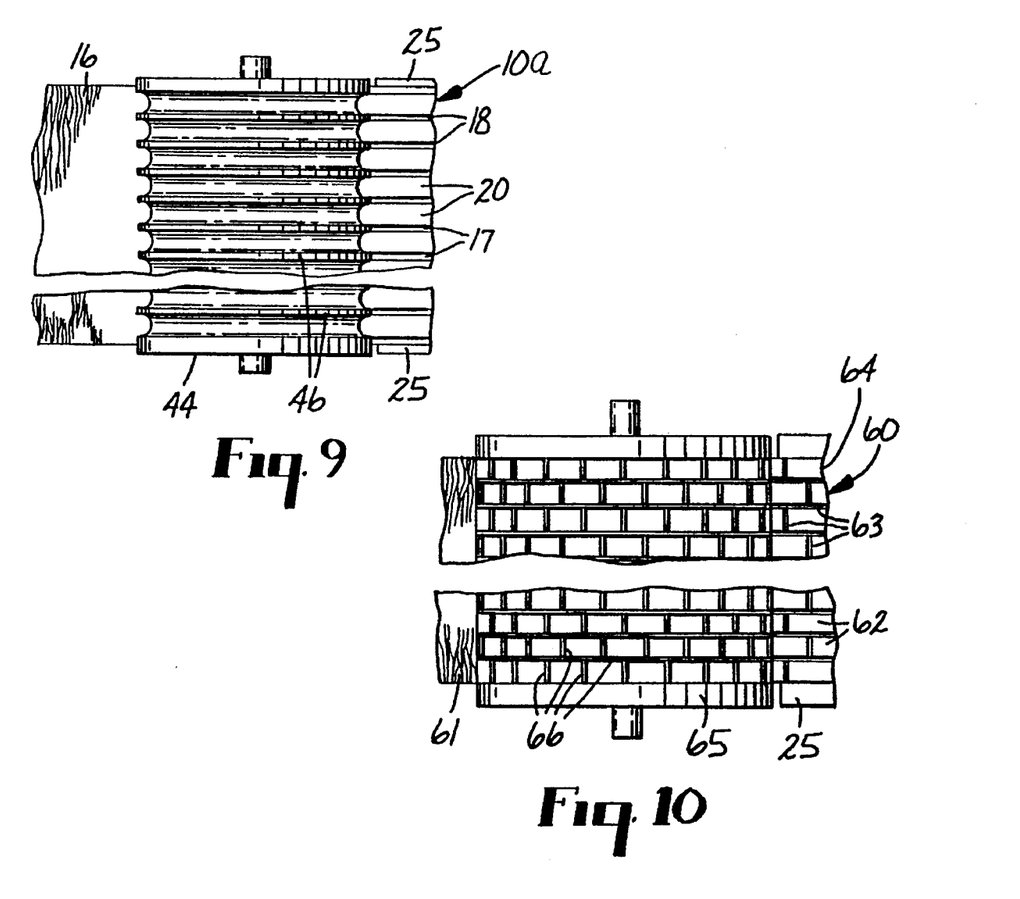
FIG. 9 is a fragmentary view taken approximately along lines 9—9 of FIG. 8.
FIG. 10 is a side view of a corrugating member that could be substituted for corrugating members illustrated in FIGS. 5, 6, and 8.

FIGS. 8 and 9 schematically illustrate a third embodiment of the method and equipment according to the present invention for forming the sheet of loop material 10a, which method is generally the same and uses much of the same equipment as is illustrated in FIG. 6 (with similar portions of that equipment having the same reference numerals), except that the first and second corrugating members 26 and 27 are replaced by first and second cylindrical heated corrugating members or rollers 44 and 45 each having an axis and including a plurality of generally annular, circumferentially extending, axially spaced parallel elongate ridges 46 around and defining its periphery, with the ridges 46 having outer surfaces and defining spaces between the ridges 46 adapted to receive portions of the ridges 46 of the other corrugating member 44 or 45 in meshing relationship with the sheet of fibers 16 between the meshed portions of the ridges 46. The corrugating members 44 and 45 are mounted in axially parallel relationship to mesh portions of the ridges 46 of the corrugating members 44 and 45; at least one of the corrugating members 44 or 45 is rotated; and the sheet of fibers 16 is fed between the meshed portions of the ridges 46 of the corrugating members 44 and 45 to generally conform the sheet of fibers 16 to the periphery of the first corrugating member 44 and form the arcuate portions 20 of the sheet of fibers 16 in the spaces between the ridges 46 of the first corrugating member 44 and the generally parallel anchor portions 17 of the sheet of fibers 16 along the outer surfaces of the ridges 46. The formed sheet of fibers 16 is retained along the periphery of the first corrugating member 44 after separation of the ridges 46; the extruded molten thermoplastic backing layer 12 from the die 24 is deposited between the formed sheet of fibers 16 along the periphery of the first corrugating member 44 and the sheet of backing material 21 along the surface of the cooling roll 25 so that the molten thermoplastic backing layer 12 envelopes and adheres the anchor portions 17 of the sheet of fibers 16 to the sheet of backing material 21, after which the sheet of loop material 10a is separated from the first corrugating member 26 and carried partially around the cooling roll 25 to complete cooling and solidification of its thermoplastic backing layer 12.

The sheet of fibers 16 fed between the meshed ridges 46 of the corrugating members 44 and 45 can be in the form of a non woven web formed by adhering the fibers together, or another sheet formed of the fibers that has sufficient internal strength so that the sheet of fibers 16 will corrugate longitudinally to conform to the ridges 46 as it is pulled into the nip between the meshing ridges 46 of the corrugating members 44 and 45. Preferably a majority of the fibers in such a non woven sheet of fibers 16 are oriented transversely of the direction the sheet of fibers 16 is fed between the corrugating members 44 and 45 so that a majority of the fibers in the resultant sheet of loop material 10a extend in directions at about right angles to the parallel bonding locations 18. A sheet of loop material 10a made by the method illustrated in FIGS. 8 and 9 will differ from a sheet of loop material 10a made by the method illustrated in FIG. 6 in that the rows of bonding locations 18 and the rows of arcuate portions 20 of the sheet of fibers 16 projecting from the front surface 13 of the thermoplastic backing layer 12 extend longitudinally in what is called the machine direction along the sheet of loop material 10a instead of transversely across the sheet of loop material 10a in what is called the cross direction.

The equipment illustrated in FIGS. 8 and 9 could also be used to form the sheet of loop material 10 by not feeding the sheet of backing material 21 or 22 around the cooling roller 25.

FIG. 10 illustrates one corrugating member 65 of a pair of cylindrical heated corrugating members that could be substituted for the corrugating members 26 and 27 or 44 and 45 to form a sheet of loop material 60 using generally the same methods described above with reference to FIGS. 5, 6 and 8 by providing a sheet of fibers 61, forming the sheet of fibers 61 between the corrugating member 65 and its mating corrugating member (not shown) so that the sheet of fibers 61 has arcuate portions 62 projecting in the same direction from spaced generally parallel anchor portions 63, and bonding the spaced generally parallel anchor portions 63 of the sheet of fibers 61 in a backing layer 64 extruded onto the anchor portions 63 with the arcuate portions 62 projecting from a front surface of the backing layer 64. The corrugating member 65 and its mating corrugating member each have an axis and including a plurality of circumferentially spaced generally axially extending discontinuous ridges 66 around and defining its periphery, with the ridges 66 on each corrugating member defining spaces between the ridges 66 adapted to receive a portion of the ridges 66 of the other corrugating member in meshing relationship in the manner of a pair of gears with the sheet of fibers 61 between the meshed portions of the ridges 66. The corrugating member 65 and its mating corrugating member are mounted in axially parallel relationship to mesh portions of the ridges 66 of the corrugating members in the manner of gear teeth; at least one of the corrugating members is rotated; and the sheet of fibers 61 is fed between the meshed portions of the ridges 66 of the corrugating members to generally conform the sheet of fibers to the periphery of the first corrugating member 65 and form the arcuate portions 62 of the sheet of fibers 61 in the spaces between the ridges 66 of the first corrugating member 65 and the generally parallel anchor portions 63 of the sheet of fibers 61 along the outer surfaces of the ridges 66. The formed sheet of fibers 61 is retained along the periphery of the first corrugating member 65 after it moves past the meshing portions of the ridges 66. The thermoplastic backing layer 64 is formed and bonded to the anchor portions 63 of the sheet of fibers 61 on the end surfaces of the ridges 66 on the first corrugating member 65 by extruding the thermoplastic backing layer 64 (e.g., polypropylene) in a molten state from a die into a nip between the anchor portions 63 of the sheet of fibers 61 on the periphery of the first corrugating member 65 and a cooling roll after which the sheet of loop material 60 is separated from the first corrugating member 65 and carried partially around the cooling roll to complete cooling and solidification of the thermoplastic backing layer 64.

Like the sheet materials 10 and 10a, the sheet material 60 made using the corrugating member 65 illustrated in FIG. 10 comprises the thermoplastic backing layer 64 and might or might not also include a sheet of backing material of the types described above, and includes the sheet of fibers 61 which has its anchor portions 63 bonded in the thermoplastic backing layer 64 at spaced elongate generally parallel bonding locations corresponding to the ridges 66 on the first corrugating member 65 with rows of the arcuate portions 62 of the sheet of fibers 61 projecting from the front surface of the thermoplastic backing layer 64 between the bonding locations, except that the rows of arcuate portions 62 are discontinuous and form a regular pattern along the sheet of loop material 60 instead of being continuous in one direction across the sheet material as in the case of the sheet materials 10 and 10a. If desired, the ridges 66 on the first corrugating member 65 could be arranged so that the anchor and arcuate portions 63 and 62 along the sheet of loop material 60 form words, numbers or symbols to, for example, form a trademark on the sheet of loop material 60.

The following are illustrative examples of sheets of loop materials according to the present invention formed by one embodiment of the method described above.

EXAMPLE NUMBER 1

The sheet of loop material 10 according to the present invention was made using the method illustrated in and described with respect to FIG. 6. Cut 9 denier polypropylene fibers 4.76 centimeters (1.875 inches) long obtained under the commercial designation "9d T-181 1⅞" from Hercules Inc., Covington, Ga. were formed, using the carding machine 30, into a continuous sheet of fibers 16 having a basis weight of 25 grams per square meter with the majority of the fibers (i.e., 90 percent) oriented in the machine direction. That sheet of fibers 16 was fed into the nip between the corrugating rollers 26 and 27 which were shaped to form along the length of the sheet of fibers 16 (1) about 7.5 loop portions 20 per 2.54 centimeter (1 inch) of sheet length with each loop portion 20 being about 0.33 cm high and about 0.33 centimeter long along the length of the sheet of fibers 16, and (2) about 7 anchor portions 17 each about 0.076 centimeter long, and to cause the formed sheet of fibers 16 to have a basis weight of 45 grams per square meter measured longitudinally of the sheet of fibers 16. The formed sheet of fibers 16 adhered preferentially to the first corrugating roll 26 due to gravity, the greater surface roughness and the slightly higher temperature of the first corrugating roller 26 (i.e., the first corrugating roller 26 was heated to 260 degrees F., whereas the second corrugating roller 27 was heated to 230 degrees F.). Polypropylene material commercially designated "Shell 7C50" commercially available from the Seadrift Polypropylene Company, Seadrift, Tex., was extruded through the die 24 at a die temperature of 480 degrees F. and onto the anchor portions 17 of the formed sheet of fibers 16 just prior to the nip between the first corrugating roller 26 and the cooling roller 25 in an amount appropriate to form the thermoplastic backing layer 12 and cause it to be about 0.0381 centimeter thick with the anchor portions 17 of the formed sheet of fibers 16 embedded therein, whereupon the formed sheet of fibers 16 and the thermoplastic backing layer 12 moved through the nip between the first corrugating roller 26 and the cooling roller 25 and about 200 degrees around the periphery of the cooling roller 25 which was at a temperature of about 85 degrees F. to ensure adequate cooling of the thermoplastic backing layer 12. The thermoplastic backing layer 12 was then printed on its side opposite the sheet of fibers 16 and the printing was easily seen through the sheet of fibers 16 along the front surface 13 of the thermoplastic backing layer 12. The resultant sheet of loop material was easily and firmly engaged by the hook material of the type described in U.S. Pat. No. 4,894,060 issued Jan. 16, 1990, the content whereof is incorporated herein by reference. A 2.54 centimeter (1 inch) wide by 17.78 centimeter (7 inch) long sample of the resultant sheet of loop material was tested in an Instron testing machine in accordance with the ASTM-D882-88 test method (the content whereof is incorporated herein by reference) which showed that at break the fibers had a tensile strength of 9.7 pounds, and had elongated by about 400 percent. This compared to a tensile strength of 6.0 pounds and an elongation of about 4.9 percent for the same fibers attached to a similar backing using sonic welding as described in the application of which this application is a continuation in part.

It is anticipated that fibers of other types than those used, particularly including bi-component fibers such as cut fibers 4.76 centimeters (1.875 inches) long having a polypropylene sheath and a polyester core such as the fibers commercially designated 10d "PP/PET 1⅞" available from BASF Corporation, Williamsburg, Va., could be substituted for the fibers indicated above and used at about the same basis weight to form a sheet of loop in which the fibers had more break strength and resiliency than the fibers used in this example.

EXAMPLE NO. 2

The sheet of loop material 10 according to the present invention was made as described above in Example No. 1 except that the nonwoven sheet of fibers 16 was of cut 10 denier 6.35 centimeter (2.5 inch) long polypropylene fibers pre-bonded in a diamond pattern and having a basis weight of 20 grams per square meter that is available from Hercules Inc., Covington, Ga. under the commercial designation "10d PP 2.5", and the cooling roll 25 was driven so that the surface speed of the cooling roll 25 was one half the surface speed of the first corrugating member 26. The sheet of loop material 10 produced was similar to that illustrated in FIG. 7 in that it had twice as many loop portions 20 per unit length as the sheet of loop material 10 produced by the method described in Example No. 1, those loops being about 0.33 centimeters in height and having a width of about 0.18 centimeter in the machine direction or longitudinally of the sheet of loop material 10. It is anticipated that the sheet of loop material 10a according to the present invention could also be made with similar loop portions 20 as those produced in this example by using the method illustrated and described above with respect to FIG. 7, and incorporating a polypropylene spun bond nonwoven sheet of backing material 21 into the backing 11a of the sheet of loop material 10a to improve the strength of its backing 11a.

EXAMPLE NO. 3

The sheet of loop material 10a according to the present invention was made as described above in Example No. 1 except that the method illustrated in and described above with respect to FIG. 6 was used and a sheet of backing material 21 in the form of a 0.0381 centimeter (0.0015 inch) thick polypropylene film was incorporated into the backing 11a of the sheet of loop material 10a so that the polypropylene material extruded through the die 24 was positioned between the anchor portions 17 of the sheet of fibers 16 and the film 21 and surrounded and adhered the anchor portions 17 of the Sheet of fibers 16 to the film 21 so that the film 21 formed the surface of the backing 11a opposite the sheet of fibers 16. The film 21 was pre-printed with characters, and those characters were easily seen through the sheet of fibers 16 on the finished sheet of loop material 10a.

The present invention has now been described with reference to several embodiments thereof. It will be apparent to those skilled in the art that many changes can be made in the embodiments described without departing from the scope of the present invention. Thus the scope of the present invention should not be limited to the structures described in this application, but only by structures described by the language of the claims and the equivalents of those structures.

We claim:

1. A disposable garment including a fastener comprising releasably engageable hook and loop portions, said loop portion comprising:

a backing comprising a thermoplastic non-fibrous backing layer with generally uniform internal structure and having front and rear major surfaces: and a sheet of longitudinally oriented fibers, said sheet of longitudinally oriented fibers having anchor portions of said sheet in the thermoplastic backing layer at spaced bonding locations and having arcuate portions of said sheet projecting from the front surface of the backing between the bonding locations, the fibers in the anchor portions of the sheet of fibers being generally non-deformed and being bonded in the thermoplastic backing layer at said spaced bonding locations.

2. A disposable garment according to claim 1 wherein said arcuate portions have a height from said backing of less than 0.64 centimeters (0.250 inch), and said fibers having a basis weight in the range of 5 to 200 grams per square meter measured along said front surface to provide sufficient open area between said fibers along said arcuate portions to afford ready engagement of said fibers along said arcuate portions by the hook portion of said fastener.

3. A disposable diaper including a fastener comprising releasably engageable hook and loop portions, said loop portion comprising:

a backing comprising a thermoplastic non-fibrous backing layer with generally uniform internal structure and having front and rear major surfaces: and a sheet of longitudinally oriented fibers, said sheet having anchor portions of said sheet in the thermoplastic backing layer at spaced bonding locations along the backing, and having arcuate portions of said sheet protecting from the front surface of the backing between the bonding locations, the fibers in the anchor portions of the sheet of fibers being generally non-deformed and being bonded in the thermoplastic backing layer at said spaced bonding locations.

4. A disposable diaper according to claim 3 wherein said arcuate portions have a height from said backing of less than 0.64 centimeters (0.250 inch), and said fibers having a basis weight in the range of 5 to 200 grams per square meter measured along said front surface to provide sufficient open area between said fibers along said arcuate portions to afford ready engagement of said fibers along said arcuate portions by the hook portion of said fastener.

5. A disposable diaper according to claim 3 wherein said diaper includes an outer polymeric layer and said rear surface of said backing is adhered to said outer polymeric layer.

\* \* \* \* \*